United States Patent [19]
Yokote

[11] Patent Number: 4,733,886
[45] Date of Patent: Mar. 29, 1988

[54] SEAT BELT

[75] Inventor: Yoshihiro Yokote, Yokohama, Japan

[73] Assignee: NSK-Warner K.K., Tokyo, Japan

[21] Appl. No.: 919,715

[22] Filed: Oct. 16, 1986

[30] Foreign Application Priority Data

Oct. 30, 1985 [JP] Japan .................. 60-167407[U]

[51] Int. Cl.4 .................................... B60R 21/10
[52] U.S. Cl. .................................. 280/804; 280/801;
297/483
[58] Field of Search ............... 280/801, 804, 806, 808,
280/802; 297/468, 476, 478, 479, 480, 482, 483,
485, 486

[56] References Cited

U.S. PATENT DOCUMENTS

| 1003 | 1/1985 | JPX . | |
|---|---|---|---|
| 4,225,155 | 9/1980 | Seiffert et al. | 280/804 |
| 4,231,591 | 11/1980 | Close | 280/806 |
| 4,256,329 | 3/1981 | Winnale | 297/483 |
| 4,327,882 | 5/1982 | Franklin et al. | 280/806 |
| 4,357,035 | 11/1982 | Stamboulian | 280/804 |
| 4,394,036 | 7/1983 | Hildebrandt | 280/804 |
| 4,422,668 | 12/1983 | Thill et al. | 280/804 |
| 4,486,031 | 12/1984 | Holler et al. | 280/802 |

Primary Examiner—Richard A. Bertsch
Attorney, Agent, or Firm—Wegner & Bretschneider

[57] ABSTRACT

A seat belt is composed of a webbing adapted for restraint of the upper torso of an occupant, connected retractably at the inboard end thereof to a retractor provided on the central side of the room of a vehicle and fastened at the outboard end thereof to a latch member releasably engageable with a first member mounted on the sash of an associated door; and a second member provided within the room of the vehicle at an outer and lower location thereof, to which the latch member with the outboard end of the webbing fastened thereto is releasably engageable. The first member may be provided displaceably along a guide rail provided on the body of the vehicle adjacent the associated door.

10 Claims, 5 Drawing Figures

SEAT BELT

BACKGROUND OF THE INVENTION (1) Field of the Invention

This invention relates to a vehicle seat belt, and more specifically to a vehicle seat belt which permits fixing of a child seat.

(2) Description of the Prior Art

In order to allow a child to sit on the passenger's seat besides the driver's seat, an additional webbing has heretofore been indispensable for fixing of a child seat on the passenger's seat in the case of a so-called automatic seat belt which restrains an occupant automatically when the occupant enters a vehicle and closes the door, especially, in the case of a seat belt equipped solely with a webbing anchored on the vehicle body at two points across the upper torso of the occupant, because the use of the above webbing alone cannot provide any sufficient fixing for the child seat.

SUMMARY OF THE INVENTION

With the foregoing in view, the present invention has as its primary object the provision of a seat belt which is suited for both adult and child without need for any additional webbing.

In one aspect of this invention, there is thus provided a seat belt comprising:

a webbing adapted for restraint of the upper torso of an occupant, connected retractably at the inboard end thereof to a retractor provided on the central side of the room of a vehicle and fastened at the outboard end thereof to a latch member releasably engageable with a first member mounted on the sash of an associated door; and a second member provided within the room of the vehicle at an outer and lower location thereof, to which the latch member with the outboard end of the webbing fastened thereto is releasably engageable.

In another aspect of this invention, the first member is provided displaceably along a guide rail provided on the body of the vehicle adjacent the associated door.

The seat belt of this invention has such an advantage that it can be used by both adult and child by using a single webbing only.

BRIEF DESCRIPTION OF THE DRAWINGS

The above and other objects, features and advantages of this invention will become from the following description and the appended claims, taken in conjunction with the accompanying drawings, in which:

DETAILED DESCRIPTION OF THE INVENTION AND PREFERRED EMBODIMENTS

Figure 1:
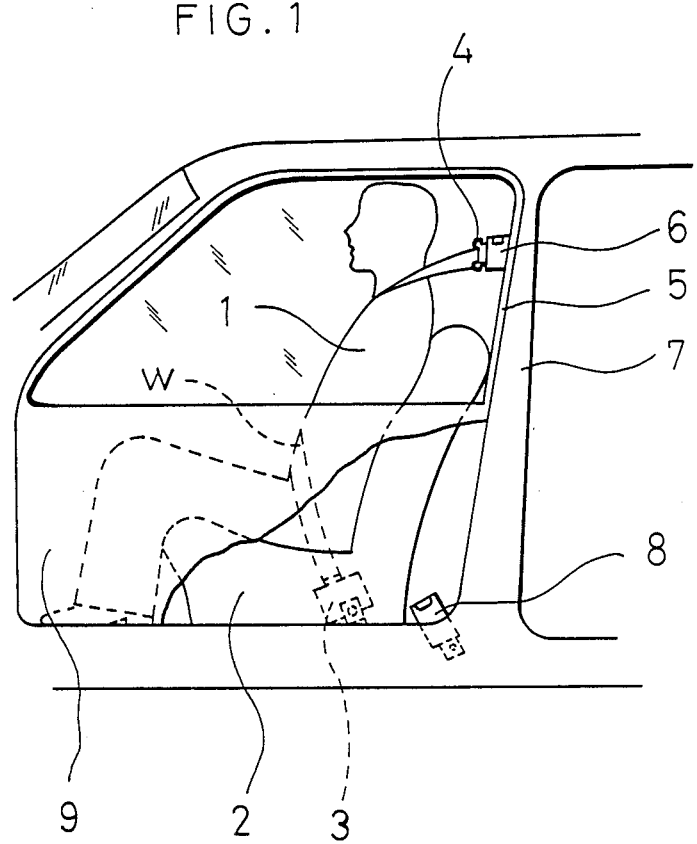
FIG. 1 is a schematic illustration of a seat belt according to the first embodiment of this invention.

Referring first to FIG. 1 of the drawings, a left-side front seat (i.e., the seat next to the driver's seat in the case of a vehicle equipped with its steering wheel on the right side thereof) is seen from the outside of the vehicle. Needless to say, the seat should be considered as the right-side front seat in the case of a vehicle equipped with its steering wheel on the left side thereof as seen commonly in the United States.

The inboard end of a webbing W, which extends diagonally over the upper torso of an occupant 1, is connected retractably to a retractor 3, preferably, of the emergency locking type provided on the central side of the room of a vehicle, for example, on an upper portion of a tunnel-shaped floor ridge in which a propeller shaft is accommodated or the inboard side of a seat 2, while the outboard end of the webbing W terminates in a tongue 4 as a latch member. The tongue 4 is releasably engageable with an emergency release buckle (hereinafter called "ERB") 6 as a first member, which is fixed on a door sash 5 by means of bolts or the like (see, FIG. 2). The occupant 1 is generally restrained owing to engagement of the tongue 4 with the ERB 6. Upon occurrence of an emergency state such as vehicle collision, the occupant is however allowed to escape from the vehicle as a result of operation of the ERB 6 internally by the occupant himself or externally by a third party.

In addition, a child seat fixing buckle 8 is also provided as a second member within the room of the vehicle at an outer and lower location thereof, for example, on a lower portion of a center pillar 7 or on the outboard side of the seat 2. The buckle 8 can releasably receive the above-mentioned tongue 4 fastened to the outboard end of the webbing W.

Figure 2:
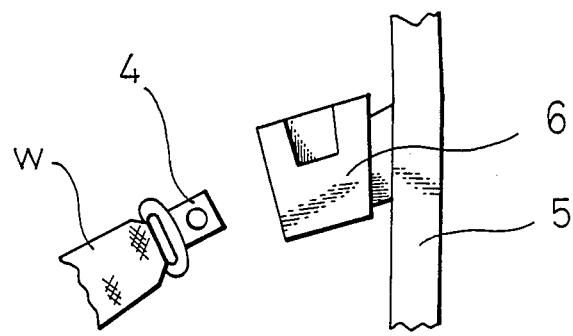
FIG. 2 is an enlarged schematic illustration of a part of the seat belt.

The operation of the seat belt according to the first embodiment of this invention, the construction of which has been described above, is now described with reference not only to FIGS. 1 and 2 but also to FIG. 3. In FIG. 1, the seat belt is used as an adult seat belt. Since the outboard end of the webbing w is connected to the door sash 5, the outboard end is caused to move toward the front of the vehicle when the occupant opens a door 9 in order to ride in the vehicle, whereby the occupant is allowed to sit easily on the seat 2. When the door is closed subsequently, the seat belt takes the position shown in FIG. 1 so that the occupant is restrained at a predetermined position by the webbing W anchored at two points on the vehicle body by way of the retractor 3 and ERB 6. In the event of an emergency, the retractor 3 detects a vehicle speed change of a predetermined value or greater or a change of a predetermined value or greater in the releasing speed of the webbing W to prevent any further release of the webbing W, thereby protecting the occupant without failure.

Figure 3:
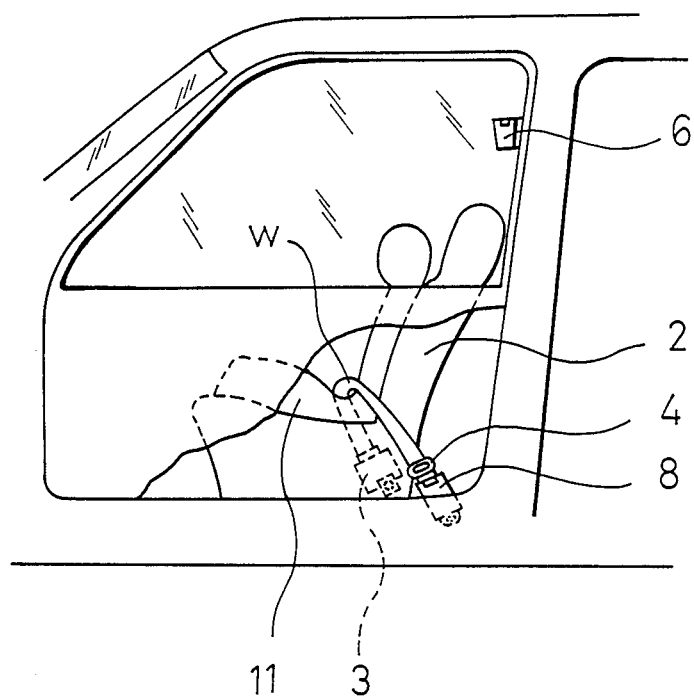
FIG. 3 is a schematic illustration of the seat belt, in which a child seat is fixed.

In order to use the seat belt according to the first embodiment of this invention as a seat belt for a child, it is only necessary to mount a child seat 11 on the seat 2 and after unbuckling the tongue 4 from the ERB 6, to bring the tongue 4 into engagement with the buckle 8 provided at the outer and lower location in the room of the vehicle as illustrated in FIG. 3. In this case, the child seat 11 is fixed at a predetermined position by the webbing W supported by the retractor 3 and buckle 8 provided on the side of the seat 2. In the event of an emergency, any further release of the webbing W from the retractor 3 is prevented as described above so that the child is protected in safe.

Where the retractor 3 provided on the central side of the vehicle room is an emergency locking retractor as described above, the release of the webbing W is not prevented unless the above-mentioned certain conditions are met. This is certainly suitable as an adult seat belt because the occupant can enjoy a substantial degree of freedom. It is however not fully preferred when the seat belt is used as a seat belt for fixing a child seat. When the vehicle is driven along repeated mild curves or is gently but repeatedly braked in the course of its driving, the child seat 11 with a child sat thereon tends to move frontwards due to its own inertia. Since the release of the webbing W from the retractor 3 is not prevented here, the webbing W may, in some instances, be pulled out gradually of the retractor 3 and may then fail to fix the child seat 11 on the seat 2 firmly.

In order to avoid occurrence of such a danger, it is preferred that the release of the webbing W from the retractor 3 is automatically prevented when the tongue 4 is brought into engagement with the buckle 8 so as to fix the child seat 11.

Figure 4:
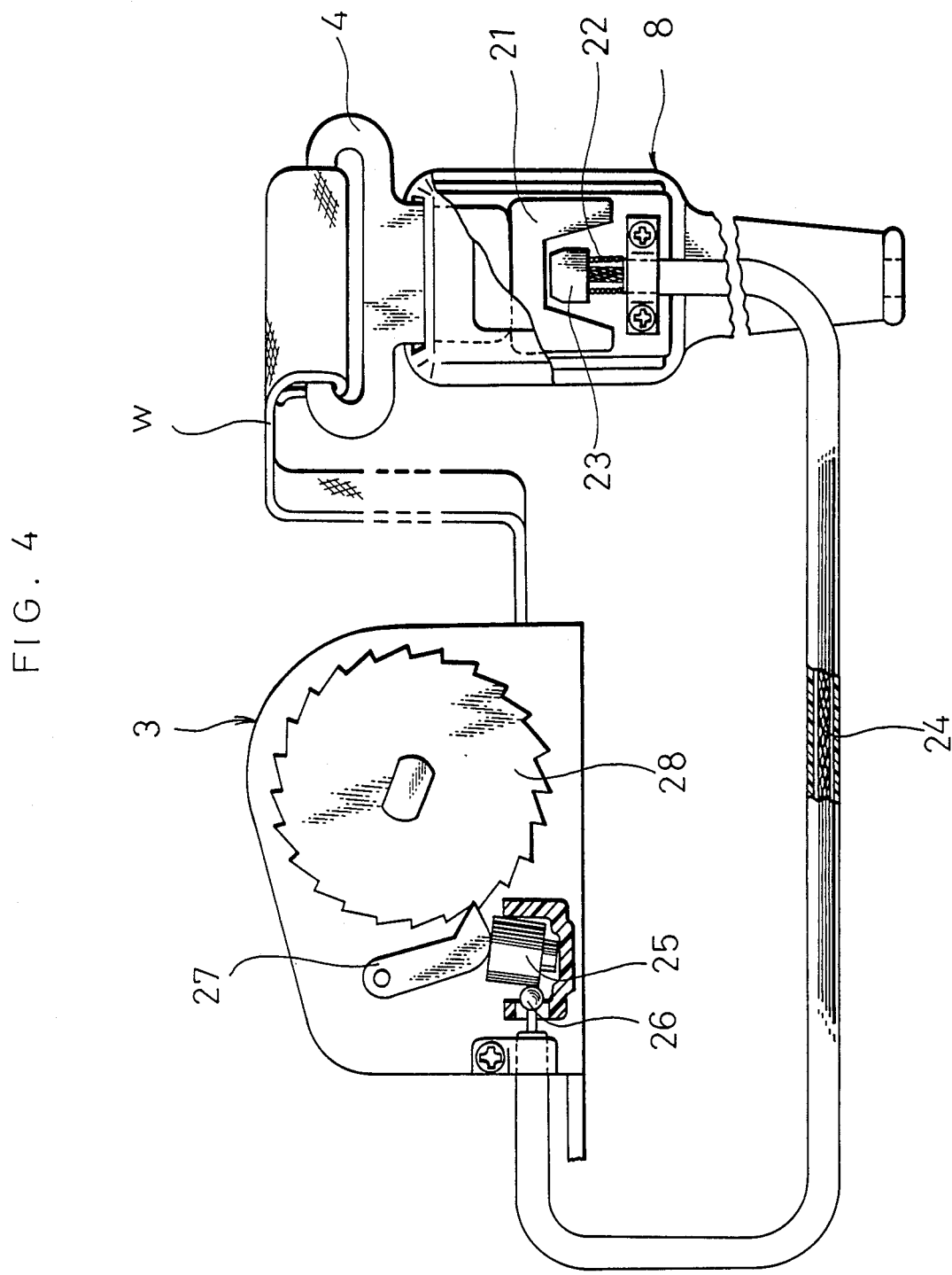
FIG. 4 is a schematic illustration showing the connection between a retractor and a buckle as a latch member.

FIG. 4 illustrates, by way of example, a structure which permits such automatic release prevention of the webbing W. A slider 21 is provided within the buckle 8 disposed at the outer and lower location in the vehicle room. The slider 21 is moved when the tongue is inserted in the buckle 8. To the slider 21, there is connected one end of a wire 24 which is equipped with an end portion 23 biased by a coil spring 22 in such a direction that the end portion 23 is normally maintained in contact with the slider 21. On the other end of the wire 24, there is provided an actuator 26 arranged close to a sensor 25 provided in the retractor 3 which is disposed on the central side in the vehicle room. Namely, the sensor 25 of the retractor 3 mounted on the vehicle body detects a speed change of the predetermined value or greater applied to the vehicle. A pawl 27 is hence brought into engagement with a ratchet wheel 28 provided as a unitary member with a take-up spindle on which the webbing W is wound, thereby preventing any further release of the webbing W.

When the tongue 4 is inserted into the buckle 8 in order to fix the child seat 11 on the seat 2, the actuator 26 causes the sensor 25 to fall so that the pawl 27 is brought into engagement with the ratchet wheel 28 and the webbing W is hence prevented from any further release. When tongue 4 is released, i.e., unbuckled from the buckle 8, the actuator 26 is brought by the biasing force of the coil spring 22 to a position where the actuator 26 is no longer engageable with the sensor 25. As a result, the sensor 25 is allowed to restore its upright position by gravity and the retractor 3 is hence allowed to operate as a usual emergency locking retractor.

Instead of the above-described mechanical linkage, the insertion of the tongue into the buckle can be electrically detected and the sensor may then be actuated by a solenoid or the like. As a further alternative, the actuator 26 may act directly on the pawl 27 instead of acting on the sensor 25.

Figure 5:
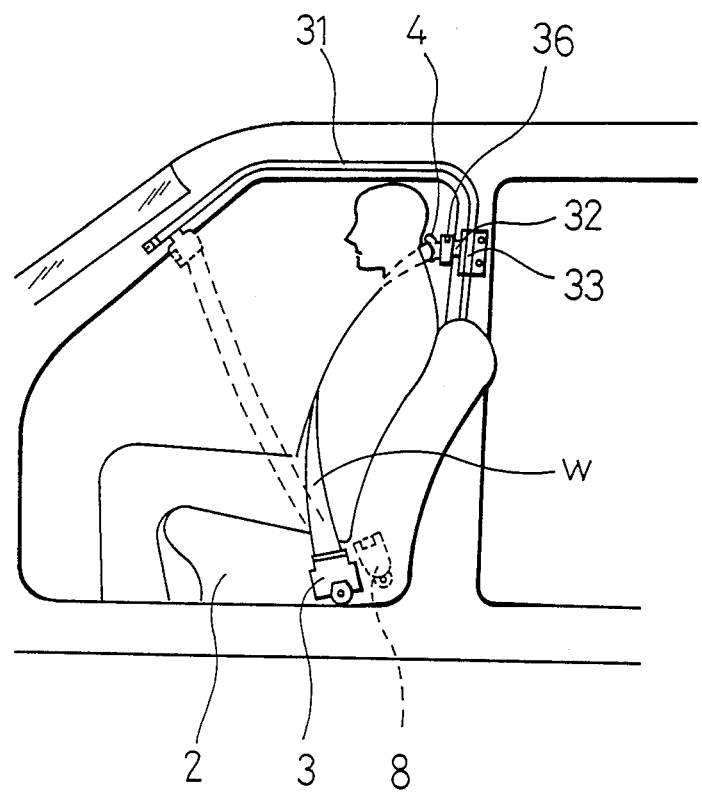
FIG. 5 is a schematic illustration of a seat belt according to the second embodiment of this invention.

The second embodiment of this invention is depicted in FIG. 5, in which a right-side front seat is seen from the inside of a vehicle. The right-side front seat is therefore considered to be the occupant's seat next to the driver's seat in a car equipped with a steering wheel on the left side of the car as seen commonly in the United States. The same elements of structure as those employed in FIG. 1 are identified by the same reference numerals and their detailed description will be omitted herein. The second embodiment is different from the first embodiment in that an ERB 36 as a first member is attached to a runner 32 which is displaceable along a guide rail 31 arranged close to the associated door (not shown) of the vehicle and is maintained in engagement with the guide rail 31. The runner 32 moves under the action of drive means (not shown) which is actuated in response to the opening or closure of the door, whereby the the webbing W is caused to move between an occupant-releasing position indicated by broken lines and an occupant-restraining position indicated by solid lines. At the occupant-restraining position, the runner 32 is prevented by latch means 33 from moving in any directions. In order to fix a child seat on the seat 2, it is only necessary, similar to the first embodiment, to unbuckle the tongue 4 from the ERB 36 and then to fasten it to the buckle 8 provided at the outer and lower location in the vehicle room.

In the above-described first and second embodiments, the tongue 4 is attached as a latch member to the outboard end of the webbing W. A buckle may however be attached to the outboard end instead of the tongue 4. In this modification, the first and second tongues which are respectively engageable as the first and second members with the buckle are provided on the door sash or runner and at the outer and lower location in the vehicle room respectively.

Having now fully described the invention, it will be apparent to one of ordinary skill in the art that many changes and modifications can be made thereto without departing from the spirit or scope of the invention as set forth herein.

What is claimed is:

1. A seat belt comprising:
   a webbing adapted for restraint of the upper torso of an occupant, connected retractably at the inboard end thereof to a retractor provided on the central side of the room of a vehicle and fastened at the outboard end thereof to a latch member releasably engageable with a first member mounted on the sash of an associated door;
   a second member provided within the room of the vehicle at an outer and lower location thereof, to which the latch member with the outboard end of the webbing fastened thereto is releasably engageable; and
   means for automatically preventing further release of the webbing out of the retractor in response to engagement of the latch member with the second member.

2. The seat belt as claimed in claim 1, wherein the first member is an emergency release buckle.

3. The seat belt as claimed in claim 1, wherein the latch member is a tongue.

4. The seat belt as claimed in claim 1, wherein the second member is a buckle.

5. The seat belt as claimed in claim 1, wherein the retractor has a take-up spindle to which the inboard end of the webbing is connected, a ratchet wheel mounted on the spindle and a pawl displaceable between an engagement position where the pawl is brought into engagement with the ratchet wheel so as to prevent rotation of the take-up spindle in the webbing-releasing direction and a non-engagement position where the pawl is maintained out of engagement with the ratchet wheel, and the preventing means is equipped with an actuator which is operated to shift the pawl to the engagement position upon engagement of the latch member with the second member.

6. The seat belt as claimed in claim 5, wherein the pawl is displaced from the non-engagement position to the engagement position by means of a sensor, which is capable of detecting a speed change of at least a predetermined value applied to the retractor, and the actuator is engageable with the sensor.

7. The seat belt as claimed in claim 5, wherein the preventing means additionally comprises a slider provided displaceably on the second member upon engagement of the latch member with the second member and transmission means for transmitting each displacement of the slider to the actuator.

8. The seat belt as claimed in claim 7, wherein the transmission means is a wire.

9. A seat belt comprising:
   a webbing adapted for restraint of the upper torso of an occupant, connected retractably at the inboard end thereof to a retractor provided on the central side of the room of a vehicle and fastened at the outboard end thereof to a latch member releasably engageable with a first member displaceable along a guide rail provided on the body of the vehicle adjacent an associated door;
   a second member provided within the room of the vehicle at an outer and lower location thereof, to which the latch member with the outboard end of the webbing fastened thereto is releasably engageable; and
   means for automatically preventing further release of the webbing out of the retractor in response to engagement of the latch member with the second member.

10. The seat belt as claimed in claim 9, wherein the first member is fixed on a runner which is maintained in engagement with a guide rail and is displaceable along the guide rail.

* * * * *